2,956,924
Patented Oct. 18, 1960

2,956,924

COCCIDIOSIS TREATMENT COMPOSITIONS CONTAINING TRIAZINE DERIVATIVES AND METHOD FOR USING SAME

Joseph J. Ursprung, Waterford, Conn., assignor to Chas. Pfizer & Co., Inc., Brooklyn, N.Y., a corporation of Delaware No Drawing. Filed Aug. 12, 1958, Ser. No. 754,535

6 Claims. (Cl. 167—53.1)

This invention relates to therapeutic compositions for use in veterinary medicine. More particularly, it relates to therapeutic compositions which are particularly effective in the treatment of a disease in poultry known as coccidiosis.

Coccidiosis is a particularly insidious problem in the raising of poultry. This disease is a protozoan infection which is found in the digestive track, particularly the intestines of young poultry, usually between the ages of 2 to 14 weeks. The disease, which is characterized by intestinal disorders, anemia, hemorrhage etc. causes extensive destruction of poultry flocks and substantial economic loss.

Of the two generally recognized types of coccidiosis, the first, cecal, is caused by the coccidium *Eimeria tenella*, and the second, intestinal, by the coccidii, *E. acervulina*, *E. nectatrix*, *E. maxima*, *E. hagani*, *E. mitis*, *E. praecox*, and *E. brunetti*. These two types are respectively referred to as acute and chronic.

It has been surprisingly found that a triazine derivative of the following formula:

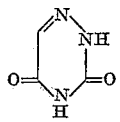

which may be named 3,5-diketo-2,3,4,5-tetrahydro-1,2,4-triazine, when administered by the oral route in small dosage is very effective in the control of coccidiosis in poultry. The present agent is useful in the treatment of an established infection of coccidiosis in poultry as well as in the prevention of such infection.

The present agent may be orally administered to poultry in a suitable carrier therefor. It is generally convenient and therefore preferred to add the agent to the poultry feed so that a therapeutic dosage of the agent is ingested with the daily poultry ration. The agent may be added directly to the feed as such or in the form of a premix or concentrate. A premix or concentrate of therapeutic agent in a carrier is commonly employed for the inclusion of the agent in the feed. Suitable carriers are liquid or solid, as desired, such as water, various meals, for example soybean oil meal, corn meal, cotton seed oil meal, sunflower seed meal, linseed oil meal, corncob meal, and mineral mixes such as are commonly employed in poultry feeds. A particularly effective carrier is the poultry feed itself, that is, a small portion of poultry feed. The carrier facilitates uniform distribution of the active materials in the finished feed with which the premix is blended. This is important because only a small proportion of the potent present agent is required. It is important that the triazine compound be thoroughly blended into the premix, and subsequently the feed. In this respect, the agent may be dispersed or dissolved in a suitable oily vehicle such as soybean oil, corn oil, cottonseed oil and the like or in a volatile organic solvent and then blended with the carrier. It will be appreciated that the proportions of active material in the concentrate are capable of wide variation since the amount of agent in the finished feed may be adjusted by blending the appropriate proportion of premix with the feed to obtain a desired level of therapeutic agent.

High potency concentrates may be blended by the feed manufacturer with proteinaceous carriers such as soybean oil meal and other meals as described above, to produce concentrated supplements which are suitable for direct feeding to poultry. In such instances the poultry is permitted to consume the usual diet. Alternatively, such concentrated supplements may be added directly to the poultry feed to produce a nutritionally balanced, finished feed containing a therapeutically effective level of the triazine of this invention. The mixtures are thoroughly blended by standard procedures, such as in a twin shell blender, to ensure homogeneity. The finished poultry feed should contain roughly between 50% and 80% of grains, between 0% and 10% animal protein, between 5% and 30% vegetable protein, between 2% and 4% minerals together with supplemental vitaminaceous sources.

The present triaxine compound may be employed at substantially low levels in feeds for the prevention or treatment of coccidiosis. Generally, the feed compositions of the present invention comprise a minor amount of the triazine compound and a major amount of a nutritionally balanced feed as described above. Feed compositions containing as little as 0.01% by weight of the present agent are found to effectively combat coccidiosis. Large amounts of the agent, say up to 0.1% by weight and larger, may also be employed. Of course, concentrations of less than 0.01% by weight provide some control of the infection.

Since 3,5-diketo-2,3,4,5-tetrahydro-1,2,4-triazine is acidic in nature, metal salts of this compound may be readily prepared. These salts may also be employed in the feed compositions and supplements of this invention. Particularly effective are the alkali and alkaline earth metal salts which have appreciable solubility in water and may be administered to poultry by dissolving in drinking water. Water which contains from about 0.1 to 1.0% by weight of active agent may be used for this purpose. By alkali metal as employed herein is meant sodium, potassium and lithium; by alkaline earth metal, barium, calcium and strontium. These salts are readily prepared by procedures well-known in the art. Generally, it is preferred to employ from about 0.01% to about 0.1% by weight of the present agent in the feed composition. The use of larger amounts, though operable, is not preferred since no appreciable advantage is realized in so doing.

Of course, the present feed compositions and supplements may also contain other effective therapeutic agents such as antibiotics to promote growth and general health of the poultry, as well as sulfa compounds which may increase the effectiveness of the present coccidiostat.

The valuable therapeutic agent of the present invention may be prepared by any of a number of procedures described in the chemical literature, for example the procedure in J. Am. Chem. Soc. 80, 976 (1958), which describes the isotopic preparation of the present compound. It is obviously not intended that the present compound should contain carbon isotopes, but rather that this synthesis may be employed. Other references to the synthesis of this compound are J. Am. Chem. Soc. 78, 1258 (1956), and ibid, 78, 1938 (1956).

The following example is given by way of illustration and is not to be considered as a limitation of the present invention, many variations of which are possible without departing from the spirit or the scope thereof.

Example I

A typical poultry feed is prepared, having the following composition:

| | Percent |
|---|---|
| Ground yellow corn | 51.28 |
| Soybean oil meal (51%) | 38.15 |
| Corn oil | 6.10 |
| $CaCO_3$ | 1.20 |
| Dicalcium phosphate | 1.35 |
| Salt | 0.61 |
| Delmix (commercially available mineral mix containing $CaCO_3$ and small amounts of iron, zinc, manganese, and so forth, salts, Limestone Products Corporation of America, New Jersey) | 0.1 |
| Vitamin A (5305 I.U./lb.) | 0.1 |
| Vitamin $D_3$ (681 I.C.U./lb.) | 0.05 |
| Klotogen F (commercially available form of vitamin K, Abbott Laboratories) | 0.0003 |
| Pyridoxine hydrochloride | 0.0006 |
| D,L-methionine | 0.140 |
| Niacin U.S.P. | 0.0025 |
| Choline chloride (25%) | 0.2 |
| Riboflavin | 0.06 |
| Calcium pantothenate (45%) | 0.002 |
| Myvamix (commercially available form of vitamin E) | 0.05 |

Various levels of 3,5-diketo-2,3,4,5-tetrahydro-1,2,4-triazine are first premixed with a part of this feed composition and then thoroughly blended into whole composition to provide feeds containing respectively 0.01%, 0.025%, 0.05%, 0.075% and 0.1% by weight of the active agent.

Eight day old chicks are used in the following trials. The chicks are inoculated orally with *E. tenella* after they have been started on the medicated feed 24 hours before. A control group of chicks of identical number are also inoculated but are fed on conventional feed. This group is known as the infected control group. The results obtained are given in the following table.

| Percent of agent in feed | Number of Chicks | Percent Mortality Treated | Percent Mortality Infected Control | Lesion Score Treated | Lesion Score Infected Control |
|---|---|---|---|---|---|
| 0.1 | 20 | 0 | 70 | 1.2 | 3.7 |
|  | 20 | 0 | 80 | 1.1 | 3.8 |
| 0.075 | 20 | 0 | 30 | 0.9 | 3.3 |
|  | 20 | 0 | 30 | 0.9 | 3.3 |
| 0.05 | 20 | 0 | 80 | 1.3 | 3.8 |
|  | 20 | 0 | 40 | 1.6 | 3.4 |
| 0.025 | 20 | 0 | 30 | 1.5 | 3.3 |
|  | 20 | 0 | 30 | 1.8 | 3.3 |
| 0.01 | 20 | 0 | 60 | 1.5 | 3.6 |
|  | 20 | 20 | 80 | 3.0 | 3.8 |
|  | 20 | 15 | 40 | 3.0 | 3.4 |
|  | 20 | 10 | 30 | 2.9 | 3.3 |

Lesion score legend: 4, means death; 3, severe infection; 2, moderate infection; 1, slight infection.

Lesion score is determined by sacrificing surviving chicks after 8 days and macroscopically examining the cecum. The present agent is found to similarly combat other coccidium species.

Example II

The procedure of Example I is repeated employing the following feed composition in place of that described:

| | Percent |
|---|---|
| Yellow corn | 71.9 |
| 45% soybean oil meal | 25.0 |
| Iodinized salt | 0.5 |
| Dicalcium phosphate | 0.5 |
| $CaCO_3$ | 1.1 |
| Vitamin premix | 0.5 |
| Trace mineral mix | 0.5 |

The vitamin premix contained: Vitamin A, 200,000 I.U.; vitamin $D_3$, 60,000 I.U.; vitamin $B_{12}$, 1.2 mg.; riboflavin, 60 mg.; pantothenic acid, 400 mg. with enough carrier to make one pound. The trace mineral mix contained the following ratios:

| | |
|---|---|
| $FeSO_4$ | 3.0 g./100 g. mixture |
| $CuSO_4$ | 0.5 g./100 g. mixture |
| $COCl_2$ | 0.8 g./100 g. mixture |
| $MnSO_4$ | 5.0 g./100 g. mixture |
| $ZnCO_3$ | 9.0 g./100 g. mixture |

Equivalent results are obtained.

Example III

The procedure of Example I is repeated using the sodium salt, potassium salt and lithium salt of 3,5-diketo-2,3,4,5-tetrahydro-1,2,4-triazine respectively in place of the compound itself with comparable results.

Example IV

The sodium salt of 3,5-diketo-2,3,4,5-tetrahydro-1,2,4-triazine is prepared by dissolving the compound in an aqueous solution containing an equivalent amount of sodium hydroxide. Concentration of the resultant solution yields the desired sodium salt.

Employing this general procedure, the potassium and lithium salts of the instant compound are similarly prepared as well as the barium, calcium and strontium salts from the respective hydroxides.

The barium, calcium and strontium salts of the present agent are used in the procedure of Example I in place of 3,5-diketo-2,3,4,5-tetrahydro-1,2,4-triazine with comparable results.

What is claimed is:

1. A feed supplement for combatting coccidiosis in poultry comprising a poultry feed and as the principal active ingredient a compound selected from the group consisting of 3,5-diketo-2,3,4,5-tetrahydro-1,2,4-triazine and alkali and alkaline earth metal salts thereof.

2. A poultry feed composition useful for combatting coccidiosis which comprises nutritionally balanced quantities of carbohydrate, protein, vitamins and minerals together with a compound selected from the group consisting of 3,5-diketo-2,3,4,5-tetrahydro-1,2,4-triazine and alkali and alkaline earth metal salts thereof.

3. A poultry feed composition useful for combatting coccidiosis which comprises grain, animal protein, vegetable protein, vitamins and minerals together with a compound selected from the group consisting of 3,5-diketo-2,3,4,5-tetrahydro-1,2,4-triazine and alkali and alkaline earth metal salts thereof.

4. A poultry feed composition useful for combatting coccidiosis which comprises a minor proportion of a compound selected from the group consisting of 3,5-diketo-2,3,4,5-tetrahydro-1,2,4-triazine and alkali and alkaline earth metal salts thereof and a major proportion of a standard feed composition containing substantially between 50% and 80% of grains, between 0% and 10% of animal protein, between 5% and 30% of vegetable protein, between 2% and 4% of minerals together with supplementary vitaminaceous sources.

5. A poultry feed composition useful for combatting coccidiosis which comprises a standard feed composition containing grain, vegetable protein, animal protein, vitamins and minerals and at least 0.01% by weight based on said composition of a compound selected from the group consisting of 3,5-diketo-2,3,4,5-tetrahydro-1,2,4-triazine and alkali and alkaline earth metal salts thereof.

6. A process for combatting coccidiosis in poultry which comprises administering to the host a compound selected from the group consisting of 3,5-diketo-2,3,4,5-tetrahydro-1,2,4-triazine and alkali and alkaline earth metal salts thereof in a carrier therefor.

References Cited in the file of this patent

Barlowe: J.A.C.S., vol. 78, 1956, pp. 1258–1259.